United States Patent [19]

Katayama et al.

[11] Patent Number: 5,349,370
[45] Date of Patent: Sep. 20, 1994

[54] SIGNAL PROCESSING CIRCUIT FOR A POINTING DEVICE

[75] Inventors: Sumio Katayama; Ichiro Usui; Takashi Yanase, all of Chofu, Japan

[73] Assignee: Mitsumi Electric Co., Ltd., Tokyo, Japan

[21] Appl. No.: 957,289

[22] Filed: Oct. 6, 1992

[30] Foreign Application Priority Data

Oct. 9, 1991 [JP] Japan ............................. 3-090679[U]

[51] Int. Cl.$^5$ ............................................. G09G 5/00
[52] U.S. Cl. ................................... 345/159; 345/145; 273/148 B
[58] Field of Search ............... 340/706, 709, 710, 711; 273/148 B, 438; 345/156, 145, 157, 158, 159, 160

[56] References Cited

U.S. PATENT DOCUMENTS

| | | | |
|---|---|---|---|
| 5,153,571 | 10/1992 | Takahashi | 340/709 |
| 5,164,713 | 11/1992 | Bain | 340/709 |
| 5,179,368 | 1/1993 | Lippincott | 345/156 |

FOREIGN PATENT DOCUMENTS

| | | | |
|---|---|---|---|
| 0004885 | 1/1981 | Japan | 340/706 |
| 0033539 | 2/1984 | Japan | 340/709 |
| 0161725 | 9/1984 | Japan | 340/709 |
| 0258637 | 12/1985 | Japan | 340/709 |

*Primary Examiner*—Richard Hjerpe
*Assistant Examiner*—Lun-Yi Lao
*Attorney, Agent, or Firm*—Frishauf, Holtz, Goodman & Woodward

[57] ABSTRACT

In a signal processing circuit for a pointing device comprising first, second, third, and fourth pressure detection elements corresponding to the movement of a cursor in an X-axis plus direction, an X-axis minus direction, a Y-axis plus direction, and a Y-axis minus direction, respectively, a first processing circuit processes a first pressure detection signal from the first pressure detection element to produce a first move signal representative of a cursor moving value in the X-axis plus direction. A second processing circuit processes a second pressure detection signal from the second pressure detection element to produce a second move signal representative of a cursor moving value in the X-axis minus direction. A third processing circuit processes a third pressure detection signal from the third pressure detection element to produce a third move signal representative of a cursor moving value in the Y-axis plus direction. A fourth processing circuit processes a fourth pressure detection signal from the fourth pressure detection element to produce a fourth move signal representative of a cursor moving value in the Y-axis minus direction. A first calculation circuit calculates a cursor moving value in an X-axis direction by the use of the first and the second move signals. A second calculation circuit calculates a cursor moving value in a Y-axis direction by the use of the third and the fourth move signals.

1 Claim, 4 Drawing Sheets

SIGNAL PROCESSING CIRCUIT FOR A POINTING DEVICE

BACKGROUND OF THE INVENTION:

This invention relates to a pointing device for use in moving a cursor displayed on a display and, in particular, to a signal processing circuit for the pointing device.

As one of the pointing devices of the type described, a mouse device has been used in an information processing apparatus for processing video information or a video game machine. The mouse device generally includes a rotary encoder having a rotary ball. In order to move a cursor displayed on a display, the mouse device is moved on a plane such as a desk to thereby rotate the rotary ball. The number of revolution of the rotary ball is detected by the rotary encoder. With reference to the number of revolution thus detected, a position of the cursor on an X-Y coordinate plane is determined. Briefly, the number of revolution is substantially converted into the position on the X-Y coordinate plane to correspondingly move the cursor displayed on the display.

As described above, the mouse device has a rotary element such as the rotary encoder combined with the rotary ball. Due to presence of such a rotary mechanism, the mouse device inevitably has a complicated structure and can not be formed into a thin shape.

SUMMARY OF THE INVENTION

It is an object of this invention to provide a signal processing circuit suitable for a pointing device which has a simple structure and which is capable of rapidly moving a cursor to a desired position.

On describing the gist of this invention, it is possible to understand that a signal processing circuit is for a pointing device including a detecting portion comprising first through fourth pressure detection elements responsive to a pressure applied to the detecting portion for producing first through fourth pressure detection signals, respectively. The signal processing circuit comprises processing means for processing the first through the fourth pressure detection signals into an X-axis movement value and a Y-axis movement value to move a cursor displayed on a display along an X-axis direction and a Y-axis direction, respectively. The first, the second, the third, and the fourth pressure detection elements are for defining the movement of the cursor in an X-axis plus direction, an X-axis minus direction, a Y-axis plus direction, and a Y-axis minus direction, respectively.

According to this invention, the processing means comprises: (A) first through fourth converting means for converting the first through the fourth pressure detection signals into first through fourth time signals representative of time values, respectively, each of the first through the fourth time signals comprising a succession of a plurality of frames for carrying the time values, (B) a first processing circuit connected to the first converting means and supplied with the first time signal for correcting a particular time value in a particular frame of the first time signal with reference to a preceding time value in a preceding frame of the first time signal to produce a corrected value and for converting the corrected value into a cursor moving value in the X-axis plus direction to produce a first move signal, (C) a second processing circuit connected to the second converting means and supplied with the second time signal for correcting a particular time value in a particular frame of the second time signal with reference to a preceding time value in a preceding frame of the second time signal to produce a corrected value and for converting the corrected value into a cursor moving value in the X-axis minus direction to produce a second move signal, (D) a third processing circuit connected to the third converting means and supplied with the third time signal for correcting a particular time value in a particular frame of the third time signal with reference to a preceding time value in a preceding frame to produce a corrected value and for converting the corrected value into a cursor moving value in the Y-axis plus direction to produce a third move signal, (E) a fourth processing circuit connected to the fourth converting means and supplied with the fourth time signal for correcting a particular time value in a particular frame of the fourth time signal with reference to a preceding time value in a preceding frame of the fourth time signal to produce a corrected value and for converting the corrected value into a cursor moving value in the Y-axis minus direction to produce a fourth move signal, (F) a first calculation circuit connected to the first and the second processing circuits for carrying out a predetermined calculation by the use of the first and the second move signals to produce the X-axis movement value, and (G) a second calculation circuit connected to the third and the fourth processing circuits for carrying out a predetermined calculation by the use of the third and the fourth move signals to produce the Y-axis movement value.

DESCRIPTION OF THE PREFERRED EMBODIMENT

Figure 1:
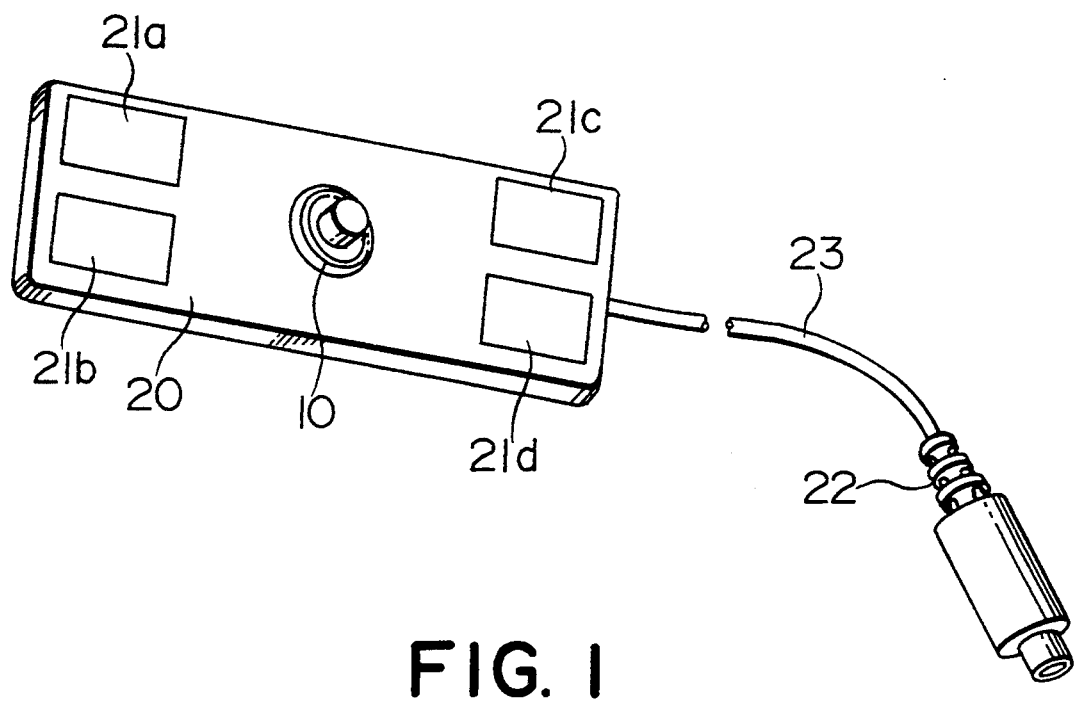
FIG. 1 is a view showing an external appearance of a controller unit with a pointing device comprising an operating portion.

Referring to FIG. 1, description will be made as regards a controller unit with a pointing device. A pointing device 10 is attached to a case 20 at a center portion thereof. The case 20 has four corners provided with push buttons 21a, 21b, 21c, and 21d for selecting functions. The pointing device 10 is manipulated to indicate rightward, leftward, upward, and downward movement of a cursor displayed on a display (not shown). The case 20 is coupled via a cable 23 to a connector 22 for connection with an electronic apparatus comprising the display.

Referring to FIGS. 2 and FIGS. 3(a)-3(c), a structure of an operating portion of the pointing device 10 will be described. A pressure sensing sheet 11 is adhered onto a printed circuit board 30 by an adhesive or a double-sided adhesive tape. A base 12 is mounted on the pressure sensing sheet 11. For example, the base 12 is made of rubber and has a substantially disk shape. First through fourth protrusions 12a, 12b, 12c, and 12d of a substantially semispherical shape are formed on an under surface of the base 12. The first through the fourth protrusions 12a through 12d are arranged around a center axis with an angular space of substantially 90°. An operation shaft 12-1 is formed on an upper surface of the base 12 to be upwardly projected therefrom. A recess 12-2 is formed on the upper surface of the base 12 to surround the operation shaft 12-1. The operation shaft 12-1 is projected out of the case 20 through an opening 20-1 formed on the upper surface of the case 20.

Figure 2:
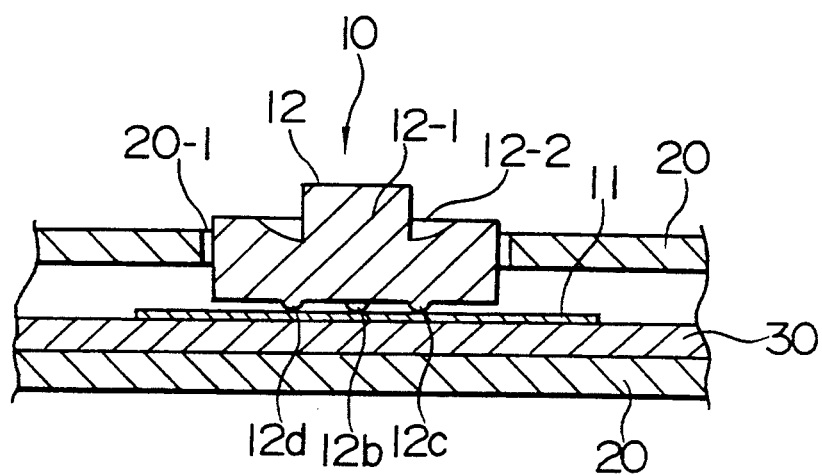
FIG. 2 is a sectional view of the operating portion of the pointing device illustrated in FIG. 1.
Figure 3A:
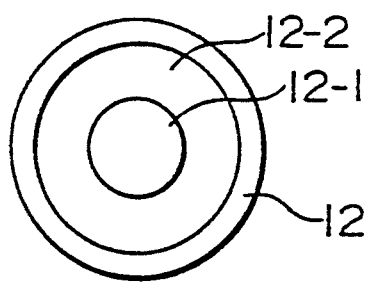
FIGS. 3(a)–3(c) show a base in the operating portion illustrated in FIG. 2.
Figure 3C:
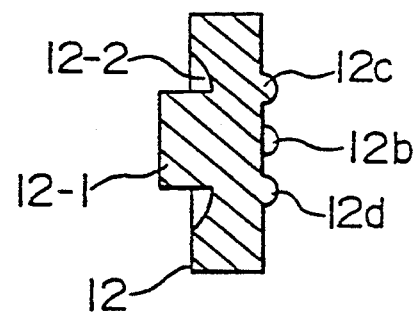
Figure 3B:
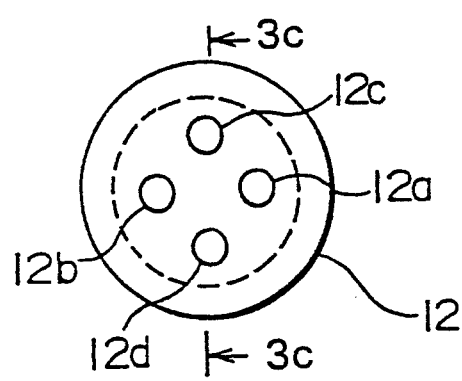
Figure 4:
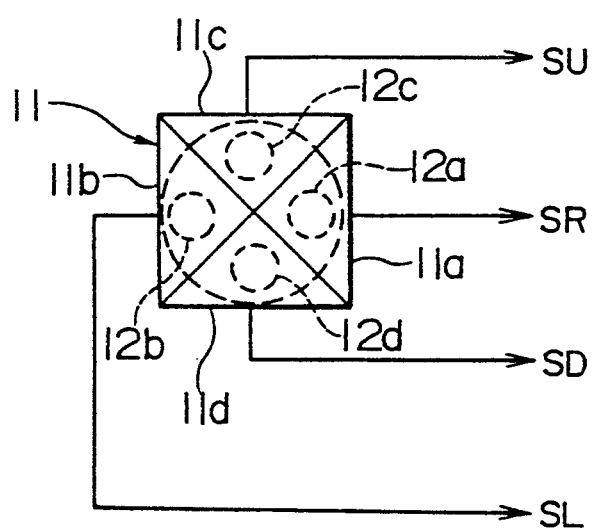
FIG. 4 is a plan view of a pressure sensing sheet in the operating portion illustrated in FIG. 2.

Referring to FIG. 4, the pressure sensing sheet 11 will be described. The pressure sensing sheet 11 is divided into four areas which serve as first through fourth pressure detection elements 11a, 11b, 11c, and 11d corresponding to the first through the fourth protrusions 12a, 12b, 12c, and 12d of the base 12, respectively. Each of the first through the fourth pressure detection elements 11a through 11d consists of a piezoelectric element and electrically connected to a circuit pattern (not shown) formed on the printed circuit board 30 (FIG. 2). The first pressure detection element 11a is responsive to a pressure applied by the first protrusion 12a and produces a first pressure detection signal SR to indicate rightward movement of a cursor on the display. The second pressure detection element 11b is responsive to a pressure applied by the second protrusion 12b and produces a second pressure detection signal SL to indicate leftward movement of the cursor on the display. Likewise, the third and the fourth pressure detection elements 11c and 11d are responsive to pressures applied by the third and the fourth protrusions 12c and 12d and produce a third pressure detection signal SU and a fourth pressure detection signal SD to indicate upward and downward movement of the cursor on the display, respectively.

In order to move the cursor by the operating portion having the above-mentioned structure, an operator places his fingers on the operation shaft 12-1 to apply a controlled pressure thereon.

Figure 5:
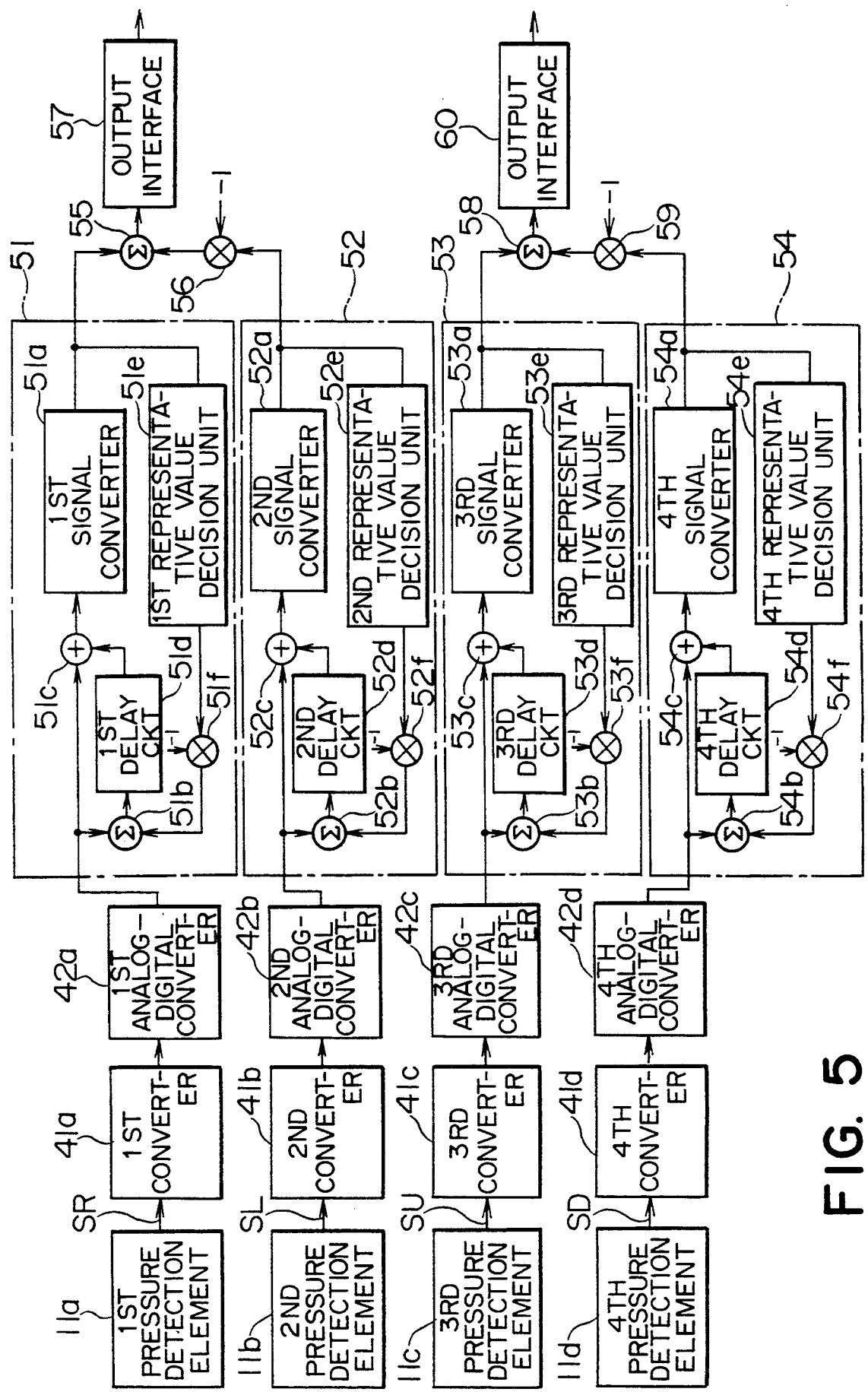
FIG. 5 is a block diagram of a signal processing circuit according to an embodiment of this invention.

Referring to FIG. 5, a signal processing circuit according to a preferred embodiment of this invention is mounted on the printed circuit board 30 illustrated in FIG. 2 and connected to the first through the fourth pressure detection elements 11a through 11d illustrated in FIG. 4. For convenience of description, rightward and leftward directions will collectively be referred to as an X-axis direction while upward and downward directions will collectively be referred to as a Y-axis direction. In this connection, the rightward, the leftward, the upward, and the downward directions will be identified as an X-axis plus direction, an X-axis minus direction, a Y-axis plus direction, and a Y-axis minus direction, respectively. Hereafter, the X-axis plus, the X-axis minus, the Y-axis plus, and the Y-axis minus directions will be simply called +X, −X, +Y, and −Y directions, respectively.

Figure 6:
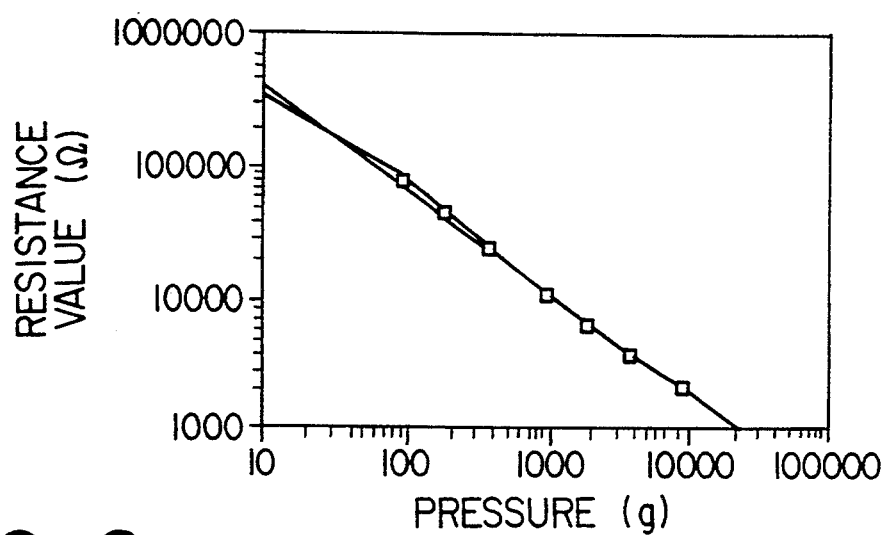
FIG. 6 shows a relationship between a pressure applied on a pressure detection element and a resistance value.

Referring to FIG. 6, each of the first through the fourth pressure detection elements 11a through 11d has a resistance value which is variable in dependent upon a magnitude of an applied pressure. The resistance value decreases with increase of the applied pressure. Thus, the first through the fourth pressure detection elements 11a through 11d produce first through fourth signals representative of variations of the resistance values as the first through the fourth pressure detection signals SR, SL, SU, and SD, respectively.

The variations of the resistance values of the first through the fourth pressure detection elements 11a through 11d are converted by first through fourth converters 41a, 41b, 41c, and 41d into time variations, respectively. Specifically, the first through the fourth converters 41a through 41d preliminarily hold time values versus the resistance values. Supplied with the first through the fourth pressure detection signals SR, SL, SU, and SD from the first through the fourth pressure detection elements 11a through 11d, the first through the fourth converters 41a through 41d produce first through fourth time signals representative of the time values, respectively. The first through the fourth time signals are supplied to first through fourth analog-digital converters 42a, 42b, 42c, and 42d to be converted into first through fourth digital signals, respectively. Each of the first through the fourth digital signals comprises a succession of a plurality of frames each of which carries the time value corresponding to the pressure applied to the pressure detection element. The time values are variable frame by frame with change of the pressure.

Figure 7:
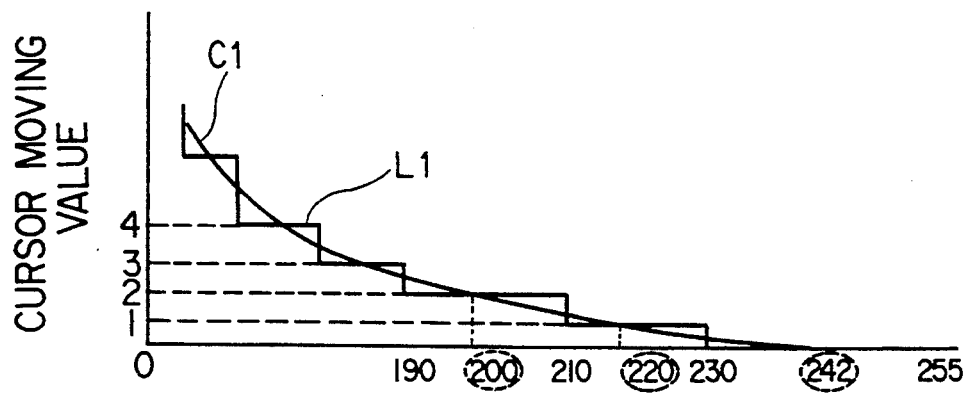
FIG. 7 is a view for describing a translation table and a translation curve used in processing circuits shown in FIG. 5.

Consideration will now be made about the first digital signal. The first digital signal is supplied to a first processing circuit 51. It is assumed here that the first digital signal has first through N-th (N being an integer not smaller than two) frames carrying first through N-th time values, respectively. The first processing circuit 51 includes a first signal converter 51a. As shown in FIG. 7, the first signal converter 51a stores a predetermined translation table. The translation table represents a cursor moving value in the +X direction versus the time value in a discrete fashion, as depicted by a stepped line L1 in the figure. For example, the cursor moving value is equal to 2 when the time value is between 190 and 210. The first processing circuit 51 further comprises first and second adders 51b and 51c as well as a first delay circuit 51d, a first representative value decision unit 51e, and a first multiplier 51f.

When the first processing circuit 51 is supplied with the first frame of the first digital signal, the first delay circuit 51d produces an output signal of a "0" level. In this event, the first time value is intactly given to the first signal converter 51a. With reference to the translation table, the first signal converter 51a produces a first cursor moving value representative of the cursor moving value in the +X direction corresponding to the first time value. The first cursor moving value is delivered to an adder 55 and to the first representative value decision unit 51e.

Referring to FIG. 7, the first representative value decision unit 51e stores the cursor moving values in the +X direction versus the time values, like the first signal converter 51a. By the use of a translation curve C1 preliminarily given, the first representative value decision unit 51a decides an intersecting point of the first cursor moving value and the translation curve C1. The time value corresponding to the intersecting point is outputted as a first representative value. For example, when the cursor moving value is equal to 1, the first representative value is equal to 220. The first representative value is multiplied by "−1" at the first multiplier 51f to calculate a first modified time value which is supplied to the first adder 51b. The first adder 51b carries out addition of the first time value and the first modified time value (namely, the first representative value is subtracted from the first time value) to produce a first deviation time value. The first deviation time value is delayed by one frame at the first delay circuit 51d and then supplied to the second adder 51c. In this connection, the second adder 51c adds the second time value carried on the second frame and the first deviation time value. The result of addition is supplied to the first signal converter 51a as a first corrected time value.

The first signal converter 51a produces a second cursor moving value representative of the cursor moving value in the +X direction corresponding to the first corrected time value. The second cursor moving value is delivered to the adder 55 and to the first representative value decision unit 51e (herein, the first cursor moving value may be equal to the second cursor moving value because the cursor moving value in the +X direction is determined in a discrete fashion as shown in FIG. 7).

In the similar manner, the first representative value decision unit 51e produces a second representative value with reference to the second cursor moving value. The first adder 51b calculates a second deviation time value representative of a deviation between the second time value and a second modified time value calculated by the first multiplier 51f. The second deviation time value is supplied through the first delay circuit 51d to the second adder 51c. In this connection, the second adder 51c adds the third time value carried on the third frame and the second deviation time value to produce a second corrected time value which is supplied to the first signal converter 51a.

Thus, the first processing circuit 51 corrects a particular time value carried on a particular frame by the use of a deviation value calculated with reference to a preceding time value carried on a preceding frame. The corrected time value is supplied to the first signal converter 51a. The first signal converter 51a converts the corrected time value into the cursor moving value in the +X direction to produce a first move signal representative of the cursor moving value in the +X direction.

Likewise, a second processing circuit 52 includes a second signal converter 52a. The second signal converter 52a also stores the translation table, as shown in FIG. 7, indicative of the cursor moving values in the −X direction versus the time values. The second processing circuit 52 further comprises third and fourth adders 52b and 52c as well as a second delay circuit 52d, a second representative value decision unit 52e, and a second multiplier 52f. The second digital signal from the second analog-digital converter 42b is corrected in the manner mentioned above and then supplied to the second signal converter 52a. The second signal converter 52a produces a second move signal representative of the cursor moving value in the −X direction.

The second move signal is multiplied by "−1" at a multiplier 56. The result of multiplication is supplied to the adder 55 as an X-axis movement correction signal. The adder 55 adds the first move signal and the X-axis movement correction signal (namely, subtracts the cursor moving value in the −X direction from the cursor moving value in the +X direction) to calculate an X-axis movement value. The X-axis movement value is delivered to an output interface 57 for the X-axis direction. The adder 55 and the multiplier 56 may collectively be referred to as a first calculation circuit.

Likewise, the third and the fourth analog-digital converters 42c and 42d produce the third and the fourth digital signals which are supplied to the third and the fourth processing circuits 53 and 54, respectively. The third processing circuit 53 includes a third signal converter 53a. As shown in FIG. 7, the third signal converter 53a also stores the translation table indicative of the cursor moving values in the +Y direction versus the time values. The third processing circuit 53 further comprises fifth and sixth adders 53b and 53c as well as a third delay circuit 53d, a third representative value decision unit 53e, and a third multiplier 53f. On the other hand, the fourth processing circuit 54 includes a fourth signal converter 54a. The fourth signal converter 54a also stores the translation table indicative of the cursor moving values in the −Y direction versus the time values. The fourth processing circuit 54 further comprises seventh and eighth adders 54b and 54c as well as a fourth delay circuit 54d, a fourth representative value decision unit 54e, and a fourth multiplier 54f.

In the manner similar to that described in conjunction with the first processing circuit 51, the third processing circuit 53 is responsive to the third digital signal and corrects the third digital signal which is then supplied to the third signal converter 53a. The third signal converter 53a produces a third move signal representative of the cursor moving value in the +Y direction. Likewise, the fourth processing circuit 54 is responsive to the fourth digital signal and corrects the fourth digital signal which is then supplied to the fourth signal converter 54a. The fourth signal converter 54a produces a fourth move signal representative of the cursor moving value in the −Y direction. The fourth move signal is multiplied by "−1" at a multiplier 59 and then supplied to an adder 58 as a Y-axis movement correction signal. The adder 58 adds the third move signal and the Y-axis movement correction signal (namely, subtracts the cursor moving value in the −Y direction from the cursor moving value in the +Y direction) to calculate a Y-axis movement value. The Y-axis movement value is delivered to an output interface 60 for the Y-axis direction. The adder 58 and the multiplier 59 may collectively be referred to as a second calculation circuit.

The X-axis and the Y-axis movement values thus obtained are delivered through the output interfaces 57 and 60, for example, to a cursor display unit (not shown). In the cursor display unit, the cursor is moved with reference to the X-axis and the Y-axis movement values.

Figure 8:
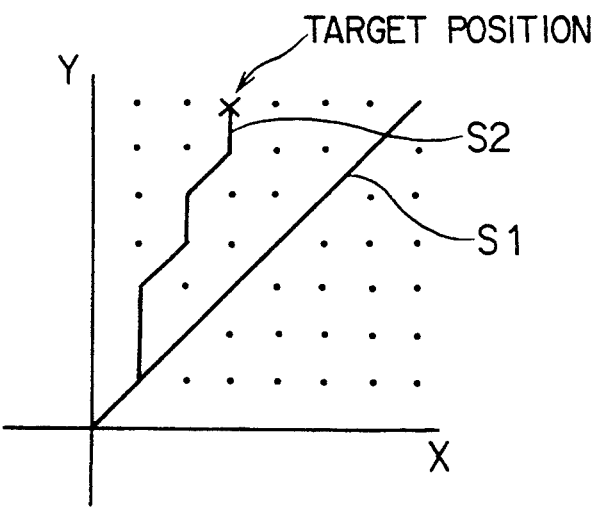
FIG. 8 is a view for describing the movement of a cursor by the pointing device combined with the signal processing circuit according to this invention in comparison with a conventional device.

Referring to FIG. 8, in a conventional signal processing circuit, the cursor may be moved in a direction of 45° as depicted by a line S1 when the pressure applied to the pressure detection element is weak. On the other hand, in the signal processing circuit according to this invention, the cursor is successively moved to a target position via a moving path as depicted by a line S2. Accordingly, it is possible to rapidly and accurately move the cursor to the target position.

What is claimed is:

1. A signal processing circuit for a pointing device including a detecting portion comprising first through fourth pressure detection elements responsive to a pressure applied to said detecting portion for producing first through fourth pressure detection signals, respectively, said signal processing circuit comprising processing means for processing said first through said fourth pressure detection signals into an X-axis movement value and a Y-axis movement value to move a cursor displayed on a display along an X-axis direction and a Y-axis direction, respectively, said first, said second, said third, and said fourth pressure detection elements being for defining the movement of said cursor in an X-axis plus direction, an X-axis minus direction, a Y-axis plus direction, and a Y-axis minus direction, respectively, said processing means comprising:

first through fourth converting means for converting said first through said fourth pressure detection signals into first through fourth time signals representative of time values, respectively, each of said first through said fourth time signals comprising a succession of a plurality of frames for carrying said time values;

a first processing circuit connected to said first converting means and supplied with said first time signal for correcting a particular time value in a particular frame of said first time signal with reference to a preceding time value in a preceding frame of said first time signal to produce a corrected value and for converting said corrected value into a cursor moving value in said X-axis plus direction to produce a first move signal;

a second processing circuit connected to said second converting means and supplied with said second time signal for correcting a particular time value in a particular frame of said second time signal with reference to a preceding time value in a preceding frame of said second time signal to produce a corrected value and for converting said corrected value into a cursor moving value in said X-axis minus direction to produce a second move signal;

a third processing circuit connected to said third converting means and supplied with said third time signal for correcting a particular time value in a particular frame of said third time signal with reference to a preceding time value in a preceding frame of said third time signal to produce a corrected value and for converting said corrected value into a cursor moving value in said Y-axis plus direction to produce a third move signal;

a fourth processing circuit connected to said fourth converting means and supplied with said fourth time signal for correcting a particular time value in a particular frame of said fourth time signal with reference to a preceding time value in a preceding frame of said fourth time signal to produce a corrected value and for converting said corrected value into a cursor moving value in the Y-axis minus direction to produce a fourth move signal;

a first calculation circuit connected to said first and said second processing circuits for carrying out a predetermined calculation by the use of said first and said second move signals to produce said X-axis movement value; and a second calculation circuit connected to said third and said fourth processing circuits for carrying out a predetermined calculation by the use of said third and said fourth move signals to produce said Y-axis movement value;

wherein each of said first through said fourth processing circuits comprises:

a signal converter for converting a particular time value in a particular frame into one of a plurality of types of cursor moving values with reference to a predetermined translation table;

a representative value decision unit connected to said signal converter and supplied with said cursor moving for deciding a representative time value with reference to a predetermined translation curve related to said translation table;

a multiplier connected to said representative value decision unit for multiplying said representative time value $-1$ to calculate a modified time value;

a first adder connected to said multiplier for adding said modified time value and said particular time value in said particular frame to calculate a deviation time value;

a delay circuit connected to said first adder for delaying said deviation time value by one frame to produce a delayed deviation time value; and a second adder connected to said delay circuit for adding said delayed deviation time value and a following time value in a following frame to calculate a corrected time value;

said signal converter being for producing a cursor moving value in a following frame with reference to said predetermined translation table and on the basis of said corrected time value.

* * * * *